July 30, 1963    G. P. AUSBURN    3,099,292
LINE BLIND
Filed June 15, 1960
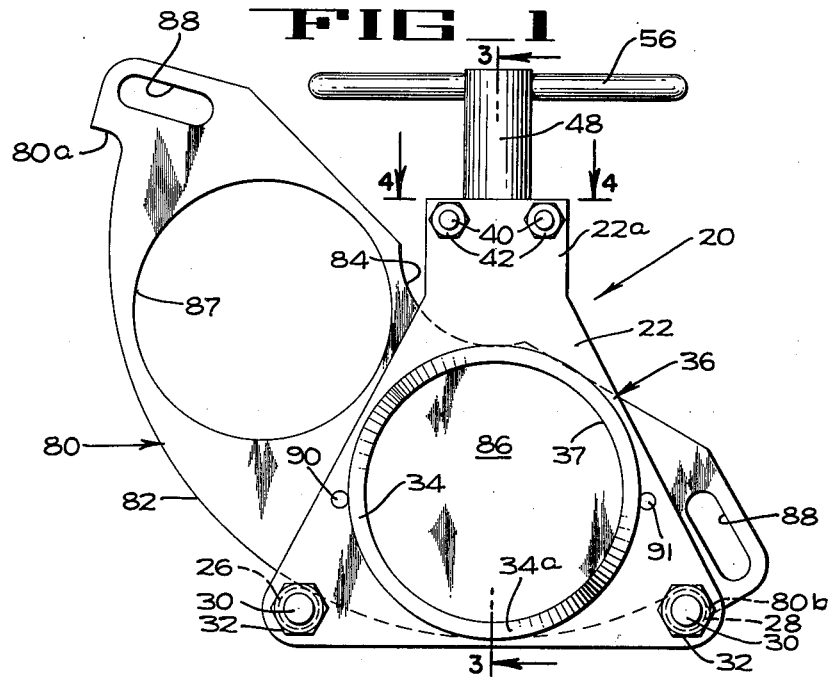
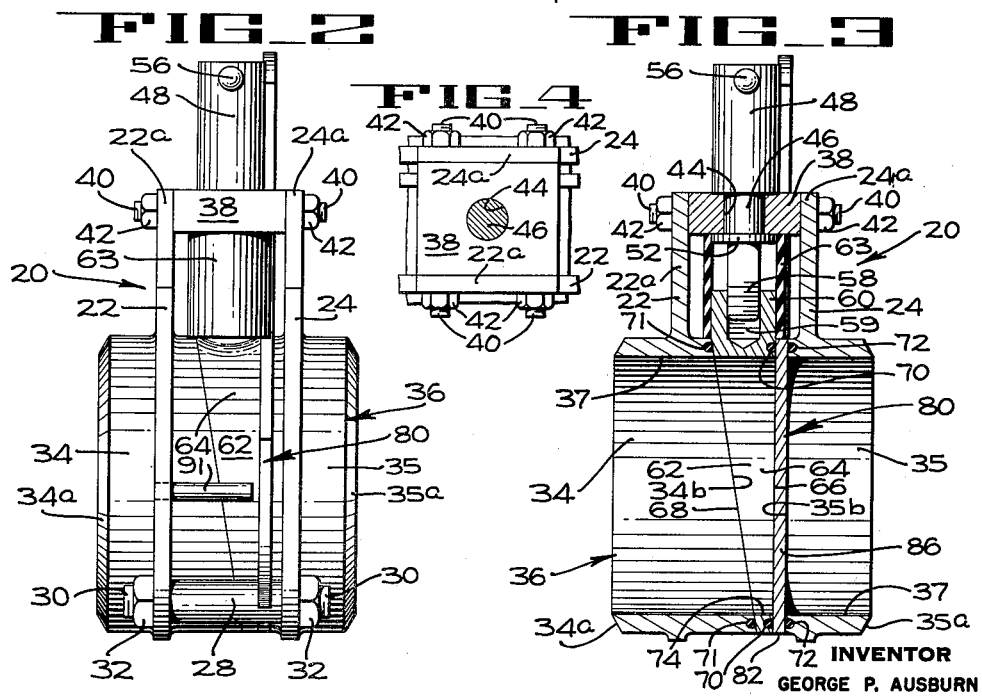
INVENTOR
GEORGE P. AUSBURN
BY *Hans G. Hoffmeister*
ATTORNEY

United States Patent Office 3,099,292
Patented July 30, 1963

3,099,292
LINE BLIND
George P. Ausburn, Los Alamitos, Calif., assignor, by mesne assignments, to FMC Corporation, San Jose, Calif., a corporation of Delaware
Filed June 15, 1960, Ser. No. 36,340
12 Claims. (Cl. 138—94.3)

The present invention pertains to valves and more particularly relates to line blinds which provide positive control of fluid in a flow line.

Line blinds are commonly used to provide positive means for regulating the flow of potentially dangerous fluids, such as steam, acid, and the like, in fluid handling systems. A distinctive feature of line blinds is that the open or shut condition of the blind is readily determined visually from any location within sight of the line blind, thus insuring the complete safety of persons who work on the downstream side thereof.

An object of the present invention is to provide an improved line blind of simplified construction which does not require the spreading of pipe sections on either side of the line blind during operation of the same.

Another object of this invention is to provide an improved line blind that is operable easily and quickly, and which is simply constructed and therefore is inexpensive to manufacture.

These and other objects and advantages of the invention will be apparent from the following description and the accompanying drawings in which:

FIGURE 1 is an end elevation of the line blind of the invention.

FIGURE 2 is a side elevation of the line blind illustrated in FIG. 1.

FIGURE 3 is an axial section along line 3—3 of FIG. 1.

FIGURE 4 is a transverse section through the valve stem along line 4—4 of FIG. 1.

The line blind 20 comprises two generally triangular body plates 22 and 24, having identical configuration and spaced apart at both of their lower corners by cylindrical spacers 26 and 28, respectively. A threaded stud 30 extends through each spacer and through aligned bolt holes in the body plates 22 and 24. Nuts 32 are engaged with the projecting ends of each stud for locking the body plates against the spacers 26 and 28.

The body plates 22 and 24 are welded to, and are integral with, a pair of axially aligned sections of pipe 34 and 35, respectively, and this structure comprises the body 36 of the line blind having a flow passage 37 therethrough. The outer ends 34a and 35a of the pipe sections 34 and 35 are chamfered to facilitate welding the body 36 into a flow line.

The upper ends of the body plates 22 and 24 include integrally formed neck portions 22a and 24a, respectively, between which is secured a rectangular spacer block 38 (FIGS. 2–4) having bolt holes extending therethrough in alignment with bolt holes in the neck portion of each body plate. Studs 40 are positioned in the bolt holes and secured by nuts 42.

The block 38 is provided with a vertically disposed central aperture 44 (FIGS. 3 and 4) in which is positioned the cylindrical shank portion 46 of a threaded stem 48. A snap-ring 52 (FIG. 3), which functions as a thrust washer, is placed in a suitable groove in the stem 48 in a position which is immediately below the block 38, and an enlarged portion of the upper end of the stem has its lower end in contact with the upper surface of the spacer block 38 to prevent axial movement of the stem 48. A handle 56 extends transversely through the upper end portion of the stem 48 to facilitate turning the stem.

Threads 58 on the lower end portion of the stem 48 engage internal threads 59 formed in a boss 60 that is integrally formed on a locking wedge 62. The wedge 62 has an annular passage therethrough corresponding in size and shape to the flow passage 37. A rubber sleeve 63 surrounds the boss 60 and the thrust washer 52 to prevent foreign matter from fouling the threads 58 and contaminating the lubricant used thereon. When the stem 48 is rotated, the locking wedge 62 is raised or lowered depending on the direction in which the stem is turned.

The locking wedge 62 (FIG. 2) comprises an annular portion 64 on which the boss 60 is formed, and is of uniformly tapered wedge shape as viewed from the side. One end surface 66 of the locking wedge 62 lies normal to the aligned axes of the pipe sections 34 and 35 and the opposite end surface 68 lies in a plane which slopes downwardly toward the plane of the surface 66 and slides on the complementally sloped inner end surface 34b of the pipe section 34. The surface 66 of the locking wedge 62 which faces the pipe section 35 is grooved to receive an O-ring 70 (FIG. 3). Similarly, the inner end surface 34b of the pipe section 34 and the inner end surface 35b of the pipe section 35 which face the wedge 62 are grooved to receive O-rings 71 and 72, respectively.

A flow control or spectacle plate 80 having a lower arcuate edge 82 and an upper arcuate edge 84 is received in the line blind body 36 in a plane normal to the body axis between the pipe section 35 and the wedge 62. The plate includes a solid portion 86 and a large circular port 87 which can be selectively aligned with the flow passage. The slower arcuate edge 82 of the spectacle plate 80 engages the outer surface of the spacers 26 and 28 (as seen in FIG. 1) and is slidable thereagainst as the plate 80 is shifted from its position blocking the flow passage 37 to its position permitting unobtacle plate 80 is facilitated by handholds 88 at the plate edges and the final position of the plate 80 with respect to the line blind body 36 is determined by shoulders 80a and 80b which abut the spacer members 26 and 28, respectively, as the plate is shifted to its open or closed position.

When the locking wedge 62 is lowered to the position in which it energizes all of the seals 70, 71 and 72, an aperture 74 thereof is aligned with the flow passage 37 through the valve body, and if the port 87 in the spectacle plate 80 is also aligned with the flow passage 37 fluid flow through the blind 20 is permitted. The locking wedge 62 is guided during the raising or lowering thereof by two guide pins 90 and 91 (FIG. 1) which are fixed to and project from the body plate 22 parallel to the flow axis of the line blind 20, one on either side of the wedge 62.

In operating the line blind 20, the locking wedge 62 is raised slightly by rotation of the handle 56 to free the spectacle plate 80. The spectacle plate 80 is then manually moved transversely of the body 36 to either its open or its closed position. If the spectacle plate port 87 is moved into alignment with the flow passage 37 and the line blind will pass fluid, the solid portion 86 of the spectacle plate will be prominently displayed to indicate the open condition of the line blind. The spectacle plate 80 also indicates when the line blind is in its closed condition by displaying the portion of the spectacle plate 80 having the port 87 therein.

When the locking wedge 62 is lowered by turning the stem 48, the O-ring seals 70 and 71 are wedged tightly against the surface of the spectacle plate 80 and the surface 68 of the wedge 62, respectively, to energize these seals and force the spectacle plate 80 tightly against the O-ring seal 72 in the end 35b of the pipe section 35.

There is no separation of the pipes interconnected by the line blind 20 when the locking wedge is fully inserted because the axial forces produced thereby are resisted by the bolts 30 and 40 which interconnect the body plates 22 and 24. No separation of the interconnected pipes is necessary for movement of the spectacle plate 80 since the required clearance for such movement is provided by loosening the wedge member 62.

Since the spectacle plate 80 is flat and of uniform thickness, it is possible to manufacture the spectacle plate of inexpensive flat plate stock. It will be recognized that the other members of the line blind of the present invention are quite simple and consequently inexpensive to manufacture.

While a particular embodiment of the present invention has been shown and described it will be understood that the line blind is capable of modification and variation without departing from the principles of the invention, and that the scope of the invention should be limited only by the scope and proper interpretation of the claims appended hereto.

The invention having thus been described, that which is claimed and desired to be protected by Letters Patent is:

1. A line blind comprising a first pipe section having a flow passage therethrough; a second pipe section spaced from said first section and having a flow passage therethrough aligned with the flow passage in said first pipe section; a plate connected to each of said pipe sections; spacer means connected between said plates for interconnecting said pipe sections in spaced-apart relationship; sealing means on said second pipe section encircling the flow passage therethrough; a wedge member mounted for movement into the space between said pipe sections; projections extending from the plate on said first pipe section for guiding said wedge member; a flat spectacle plate positioned across said flow passage between said wedge member and the annular sealing means on said second pipe section, said spectacle plate being guided for movement in an arcuate path across said passage by said wedge, said sealing means, and said spacer means; shoulders on said spectacle plate for abutting said spacer means for limiting the arcuate movement of said spectacle plate; and means for moving said wedge member with respect to said projections to urge said spectacle plate into sealing engagement with said sealing means.

2. A line blind comprising a first pipe section having a flow passage therethrough; a second pipe section spaced from said first pipe section and having a flow passage therethrough aligned with the flow passage in said first pipe section; a plate connected to each of said pipe sections; spacer means connected between said plates for interconnecting said pipe sections in spaced-apart relationship; a spectacle plate mounted in the space between said pipe sections; an annular sealing means on said second pipe section concentric with the flow passage therethrough; a wedge member mounted for movement into the space between said pipe sections adjacent said spectacle plate for forcing said spectacle plate to seal against said sealing means; projections extending from the plate on said first pipe section for guiding said wedge member; said spectacle plate being guided for movement in an arcuate path across said passage by said wedge, said sealing means, and said spacer means; shoulders on said spectacle plate for abutting said spacer means for limiting the arcuate movement of said spectacle plate; and a threaded shaft mounted between said plates and operable to move said wedge member into and out of clamping engagement with said spectacle plate.

3. A line blind comprising a first pipe section having a flow passage therethrough; a second pipe section spaced from said first section and having a flow passage therethrough aligned with the flow passage in said first pipe section; a plate connected to each of said pipe sections; rigid spacer means connected between said plates for interconnecting said pipe sections in spaced apart relationship; a wedge member mounted for movement within the space between said pipe sections and having a flow passage therethrough; a flat spectacle plate slidably positioned across said flow passage between said wedge member and one of said pipe sections, said spectacle plate being slidable into separate positions with respect to the flow passage including a position blocking completely said passage and a position allowing unobstructed flow through said passage while the spectacle plate remains in its position between said wedge member and said one pipe section, said spectacle plate being guided across said passage by said spacer means; and means for moving said wedge member within the space between said pipe sections to urge said spectacle plate into sealing engagement with said one pipe section while maintaining the relationship of said plates and said spacer means to each other.

4. A line blind comprising a first pipe section having a flow passage therethrough; a second pipe section spaced from said first section and having a flow passage therethrough aligned with the flow passage in said first pipe section; plates connected respectively to said pipe sections; rigid spacer means connected between said plates for interconnecting said pipe sections in spaced apart relationship; a wedge member having a flow passage therethrough mounted for movement within the space between said pipe sections, said wedge member having a threaded socket thereon; a threaded shaft positioned through said spacer means and rotatable therein, said shaft having a threaded end engaging said socket for moving said wedge within said space upon rotation of said shaft; and a flat spectacle plate slidably positioned in said space across said flow passage and being guided in movement across said passage by said spacer means, rotation of said shaft in one direction being effective to move said spectacle plate into sealing engagement with one of said pipe sections by said wedge member while maintaining the relationship of said plates and said spacer means with respect to each other.

5. A line blind comprising a first pipe section having a flow passage therethrough; a second pipe section spaced from said first section and having a flow passage therethrough aligned with the flow passage in said first pipe section; a plate connected to each of said pipe sections; rigid spacer means connected between said plates for interconnecting said pipe sections in spaced apart relationship; a wedge member having a flow passage therethrough mounted for movement within the space between said pipe sections, said wedge member having a threaded socket thereon; a threaded shaft positioned through said spacer means and rotatable therein, said shaft having a threaded end engaging said socket for moving said wedge within said space upon rotation of said shaft; a resilient longitudinally compressible sleeve attached to said wedge member around said socket and extending in a direction to surround the threads on said shaft; and a flat spectacle plate slidably positioned in said space across said flow passage and being guided in movement across said passage by said spacer means, said spectacle plate being movable into sealing engagement with one of said pipe sections by said wedge member when said shaft is rotated in one direction while maintaining the relationship of said plates and said spacer means with respect to each other.

6. A line blind comprising a first pipe section having a flow passage therethrough; a second pipe section spaced from said first section and having a flow passage therethrough aligned with the flow passage in said first pipe section; a plate connected to each of said pipe sections; spacer means rigidly connected between said plates for interconnecting said pipe sections in spaced apart relationship; a wedge member mounted for movement within the space between said pipe sections and having a flow passage therethrough; projections extending from said first pipe section for guiding said wedge member; a flat spectacle plate slidably positioned across said flow passage between said wedge member and said second pipe section, said spectacle plate being guided in movement across said passage by said spacer means; and means for moving said wedge member within the space between said pipe sections to urge said wedge member into sealing engagement with said first pipe section and to urge said spectacle plate into sealing engagement with said second pipe section while maintaining the relationship of said plates and said spacer means to each other.

7. In a line blind, first and second pipe sections having annular end edges circumscribing flow passages in their respective sections; means interconnecting said pipe sections with their flow passages in axially aligned relation and with their end edges in adjacent spaced, confronting relation thereby defining a space between said sections, said interconnecting means including support members spaced circumferentially about said sections and positioned so that a plane passing between said end edges also passes through said support members; and an elongated spectacle plate having a longitudinally extending arcuate support edge, an imperforate portion and a port, said imperforate portion and said port being spaced lengthwise of said plate, and said plate being positioned in said space substantially in said plane with said support edge slidably supported on said support members and being slidably movable thereon as said plate is shifted between an open position with said port in registration with said aligned passages and a closed position with said imperforate portion engaging said end edges and extending over said passages.

8. In a line blind, first and second pipe sections having respective annular end edges and flow passages and being rigidly interconnected with said flow passages in alignment and with said end edges in adjacent spaced confronting relation thereby providing a space between said sections; support members mounted in fixed positions spaced circumferentially of said sections and facing the space between said sections; and an elongated spectacle plate positioned in said space between said end edges and having opposite end portions, a longitudinally extending arcuate support edge slidably supported on said support members, a port, and an imperforate portion spaced from said port and being larger than said passages, said spectacle plate being movable in said space, with said support edges sliding on said support members, between an open position with said port in registration with said passages and a closed position with said imperforate portion extending over said passages and blocking the flow of fluid between said passages.

9. The line blind of claim 8 wherein said spectacle plate has shoulder portions projecting outward from said support edge adjacent to said end portions of the plate, said shoulder portions being engageable with said support members during slidable movement of said plate for limiting sliding movement of said plate in said closed and open positions.

10. The line blind of claim 8 including wedge means having an aperture therein and being positioned between and in slidable engagement with the end edge of said first pipe section and said plate for movement between a wedging position wherein said aperture is in registration with the passage in said first section and said plate is urged into fluid-tight engagement with the end edge of said second pipe section and a retracted position wherein the pressure urging the plate against said second end edge is relieved.

11. In a line blind, first and second pipe sections having flow passages therethrough and annular end edges; mounting plates individually secured to said pipe sections and projecting radially outward therefrom, said sections being positioned with their passages in alignment and with said mounting plates facing each other; spacers positioned between and abutting said mounting plates and holding said end edges in axially spaced relation to each other thereby defining an opening between said pipe sections, and said spacers spanning said opening and being spaced circumferentially about said sections in generally triangular relationship; means connecting said spacers to said mounting plates; and an elongated spectacle plate positioned in said opening in substantially normal relation to the axis of said aligned passages, said spectacle plate having an imperforate portion, a port spaced lengthwise of the spectacle plate from said imperforate portion, and a longitudinally extending arcuate support edge slidably supported on two of said spacers and being slidably movable thereon as said spectacle plate is moved between an open position wherein said port is in registration with said passages and a closed position wherein said imperforate portion covers said passages.

12. The line blind of claim 11 including an annular wedge member having an aperture therein and being mounted between and in slidable engagement with the end edge of said first pipe section and said spectacle plate, said wedge member having a threaded socket projecting toward a third spacer; and including a shaft rotatably mounted in said third spacer and having a threaded portion threadably received in said socket for moving said wedge between a wedging position wherein it forces said spectacle plate into fluid tight engagement against the end edge of said second pipe section and a retracted position withdrawn from said wedging position.

References Cited in the file of this patent

UNITED STATES PATENTS

| 958,862 | Durham | May 24, 1910 |
|---|---|---|
| 1,167,695 | Huff | Jan. 11, 1916 |
| 2,605,078 | Valpin | July 29, 1952 |
| 2,743,742 | Muff | May 1, 1956 |
| 2,781,787 | Johnson | Feb. 19, 1957 |
| 2,946,349 | Hamer | July 26, 1960 |